(12) United States Patent
Lota et al.

(10) Patent No.: US 9,124,109 B2
(45) Date of Patent: Sep. 1, 2015

(54) CONSOLE ASSEMBLY WITH CHARGING STATE INDICATOR

(75) Inventors: Charan Singh Lota, Canton, MI (US);
Michael Lambert, Ann Arbor, MI (US);
Randy Stephens, Ypsilanti, MI (US);
Robert Crawford, Pinckney, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 360 days.

(21) Appl. No.: 13/594,231

(22) Filed: Aug. 24, 2012

(65) Prior Publication Data

US 2013/0257363 A1    Oct. 3, 2013

Related U.S. Application Data

(60) Provisional application No. 61/618,025, filed on Mar. 30, 2012.

(51) Int. Cl.
*H02J 7/00* (2006.01)

(52) U.S. Cl.
CPC ......... *H02J 7/0047* (2013.01); *H02J 2007/005* (2013.01)

(58) Field of Classification Search
CPC .... H02J 7/005; H02J 7/0047; A61M 2205/50
USPC .................................................. 320/108, 109
See application file for complete search history.

(56) References Cited

U.S. PATENT DOCUMENTS

| | | | |
|---|---|---|---|
| 6,811,197 B1 * | 11/2004 | Grabowski et al. | .......... 296/37.8 |
| 7,705,565 B2 | 4/2010 | Patino et al. | |
| 7,940,024 B2 | 5/2011 | Zhang et al. | |
| 2005/0280398 A1 | 12/2005 | Lee et al. | |
| 2007/0075153 A1 | 4/2007 | Blanchard | |
| 2007/0233003 A1 * | 10/2007 | Radgowski et al. | ........... 604/151 |
| 2008/0023625 A1 * | 1/2008 | Plank et al. | ............. 250/227.11 |
| 2008/0079388 A1 | 4/2008 | Sarnowsky et al. | |
| 2008/0203968 A1 | 8/2008 | Campbell | |
| 2011/0082615 A1 | 4/2011 | Small et al. | |
| 2011/0227716 A1 | 9/2011 | Lucas | |
| 2011/0241607 A1 * | 10/2011 | Wiegers | ........................ 320/108 |
| 2012/0149323 A1 * | 6/2012 | Springs et al. | ............. 455/404.1 |
| 2013/0110428 A1 * | 5/2013 | Sun et al. | ......................... 702/63 |

FOREIGN PATENT DOCUMENTS

| | | |
|---|---|---|
| CN | 102077438 A | 5/2011 |
| GB | 2416533 A | 2/2006 |
| JP | 3027605 U | 5/1996 |
| JP | 3093162 U | 1/2003 |
| JP | 2003174729 A | 6/2003 |
| JP | 200515710 A | 6/2005 |
| JP | 2006014587 A | 1/2006 |
| JP | 2007520182 | 7/2007 |
| JP | 2009177938 A | 8/2009 |
| WO | 2010093724 A1 | 8/2010 |

* cited by examiner

*Primary Examiner* — Vuthe Siek
(74) *Attorney, Agent, or Firm* — Gifford, Krass, Sprinkle, Anderson & Citkowski, P.C.

(57) ABSTRACT

A console assembly and a system operable to provide visual identification of the charging state of an electronic device is provided. The console assembly and system includes a processor operable to processing the charging state of the electronic device. A light source is in communication with the processor. The light source is configured to change the character of light being emitted. The processor is operable to actuate the light source so as to change the character of the emitted light source to reflect the charging state of the electronic device.

14 Claims, 2 Drawing Sheets

CONSOLE ASSEMBLY WITH CHARGING STATE INDICATOR

CROSS-REFERENCE TO RELATED APPLICATION(S)

This Application claims the benefit of U.S. Provisional Application 61/618,025 filed on Mar. 30, 2012, the contents of which are incorporated herein in its entirety.

FIELD OF THE INVENTION

The invention relates to a console assembly for use in an automotive vehicle. The console assembly is configured to provide a visual indication of the charging status of a handheld electrical device.

BACKGROUND OF THE INVENTION

Console assemblies include a housing for storing articles. Some console assemblies also include a compartment having ports for connecting electronic devices. Some of the ports are operable to charge the electronic device, such as a cigarette lighter socket, or a Universal Serial Bus (USB). Some compartments may include an inductive charging pad operable to inductively charge the electronic device.

Currently, users often handle the electronic device to determine the charging state. However, it remains desirable to have a console assembly wherein the charging state of the electronic device is provided without having the user hold or pick up the electronic device.

SUMMARY OF THE INVENTION AND ADVANTAGES

The present invention provides for a console assembly having a light source configured to emit a light characteristic corresponding to the charging state of an electronic device. The console assembly includes a charger configured to charge the electrical device. A processor is operable to process battery information so as to calculate a charging state of the electronic device. The processor transmits the charging state of the electronic device so as to actuate the light source in a manner corresponding to the charging state of the electronic device.

The console assembly may include a storage area configured to hold the electronic device. The storage area includes a first floor, a pair of first side walls, a first front wall, and a first back wall. The storage area is dimensioned in size so as to hold a hand held electronic device such as a smart phone.

The charger may be an electrical port in electrical communication with a power source such as the vehicle battery. For instance, the electrical port may be a USB port or a cigarette lighter. Aftermarket connections may be used to couple the electrical device to the power source.

The light source may be mounted to an undersurface of a top wall so as to direct light onto the storage area. The processor calculates the charging state of the electronic device and transmits a signal to the light source, wherein the light source is actuated so as to visually notify the user that the electronic device is being charged. It should be appreciated that the signal may be modified to actuate the light source in a manner consistent with the charging state of the electrical device. For instance, in instances where the electrical device is relatively low on battery power, the signal may be a small power supply to the light source so as to reduce the intensity of the light emitted. As the battery increases in capacitance, the signal may increase, that is the power supply increases so as to increase the intensity of the light emitted. Accordingly, the light source may be actuated so as to vary the characteristic of the emitted light in correspondence with the charging state of the battery. Accordingly, the console assembly is operable to a visual notification of the charging state of an electronic device without having the user look directly at the electronic device.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

Figure 1:
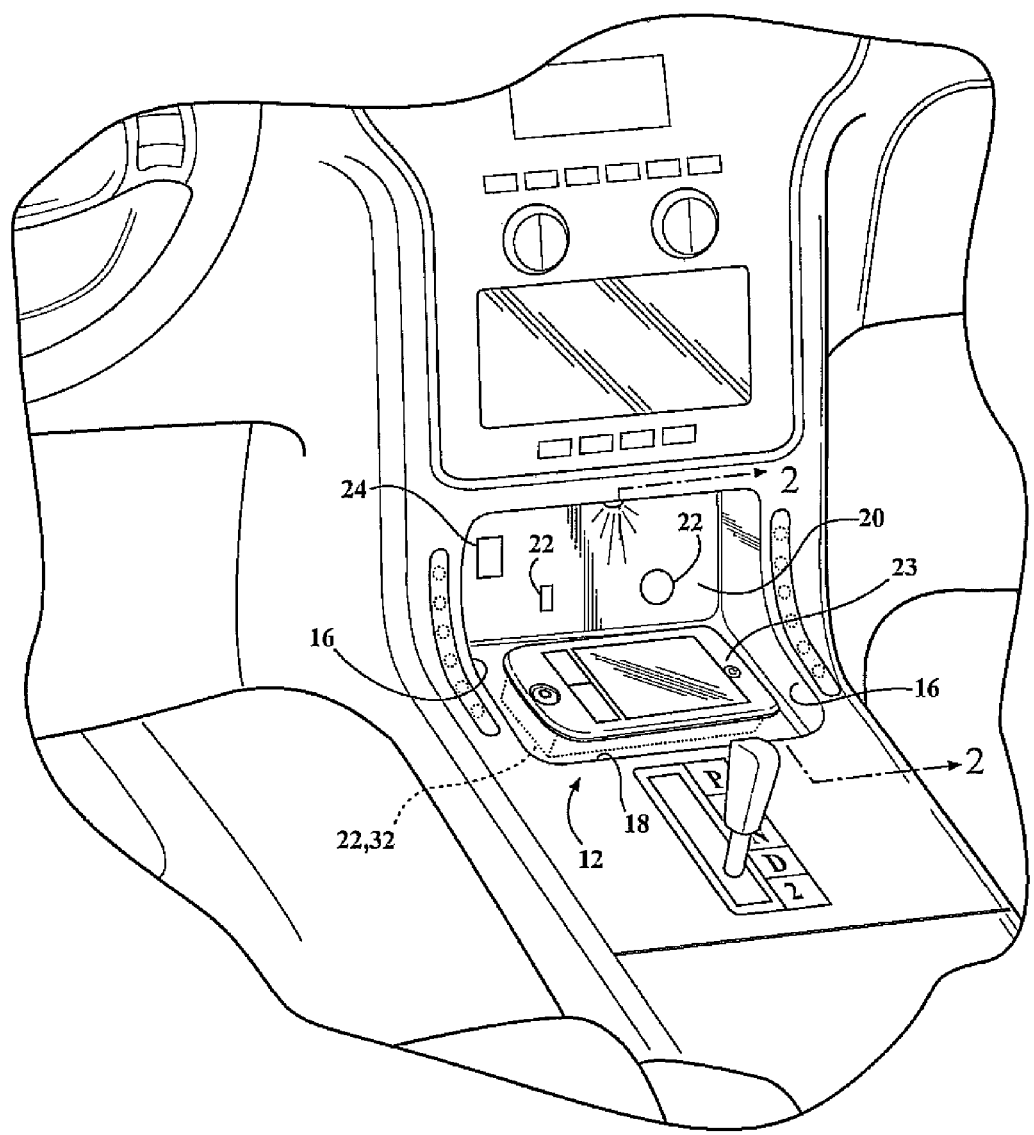
FIG. 1 is perspective view of the console assembly.
Figure 2:
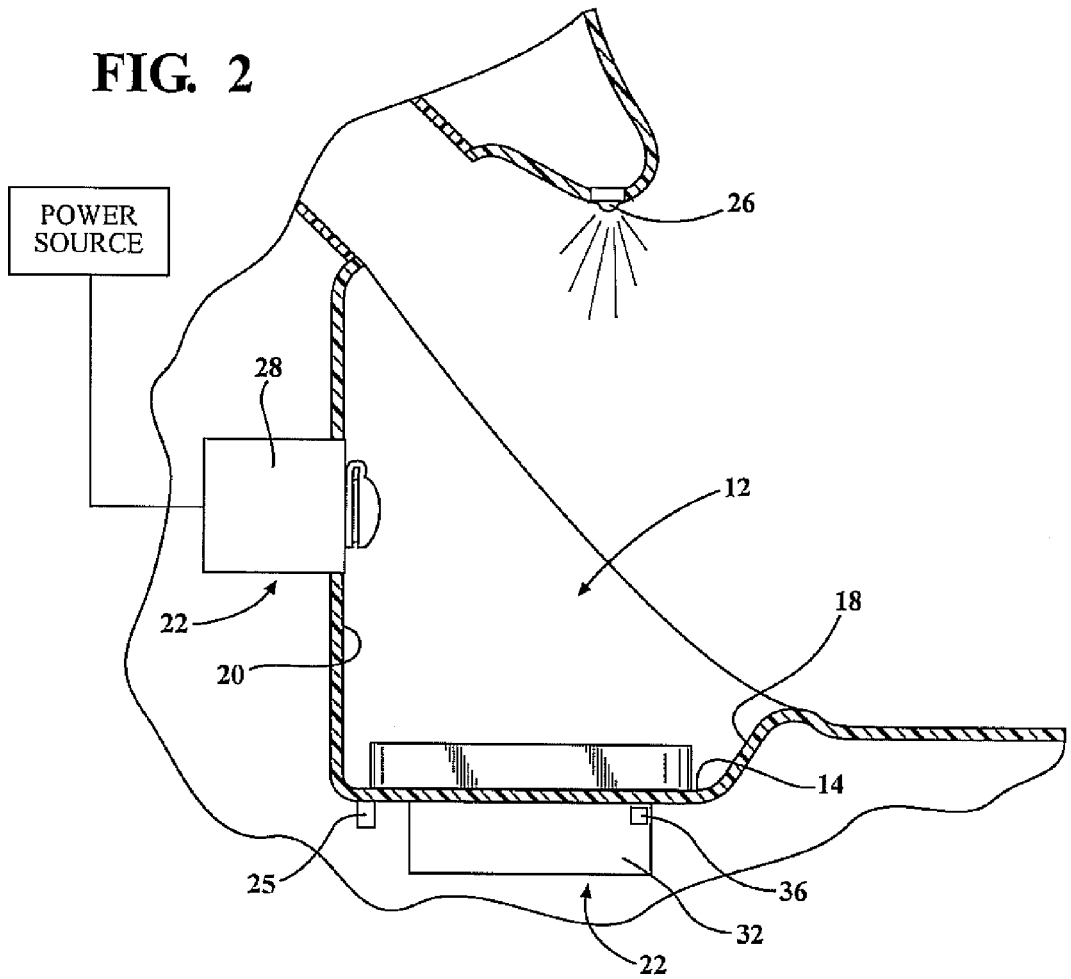
FIG. 2 is a cross-sectional view of the console assembly of FIG. 1, take along lines 2-2.

Referring to the Figures, wherein like numerals indicate corresponding parts throughout the several views, a console assembly 10 for use in an automotive vehicle is provided. The console assembly 10 is disposed between a front passenger and driver seat (not shown). The console assembly 10 may be formed of a polymer through an injection molding process.

The console assembly 10 includes a storage area 12. The storage area 12 is configured to hold various articles. The first storage area 12 includes a first floor 14, a pair of first side walls 16, a first front wall 18, and a first back wall 20. Each of the first side walls 16 extend upwardly between opposite edges of the first floor 14 and extend along a plane oriented along the length of the vehicle, as indicated generally by line 2-2. The first front wall 18 is disposed rearward of the first back wall 20 with respect to the front of the vehicle. The first front wall 18, the first back wall 20 and first side walls 16 define a storage space having a first opening operable to receive articles.

The console assembly 10 further includes a charger 22 operable to charge the electronic device 23. A processor 24 is in communication with a light source 26. The processor 24 is also in communication with the charger 22. The processor 24 is operable to process information from the charger 22 so as to calculate the charging state of the electronic device 23. The processor 24 is further operable to actuate the light source 26 so as to emit a light characteristic corresponding to the charging state of the electronic device 23.

The charger 22 may be one of a plurality of electrical ports 28 for transmitting electricity to an electronic device 23. One of the electrical ports may be a USB port, or a cigarette lighter socket. The electrical ports 28 may be disposed on the first back wall 20, or one of the pair of first side walls 16 (not shown). Additionally, the charger 22 may be an inductive charger 32. Any inductive charger 32 currently known and used may be adapted for use herein. The inductive charger 32 is configured to provide an inductive charge to charge the battery of the electronic device 23. The inductive charger 32 may further include a receiver operable to receive a signal from the battery. Information may be provided with the signal, to include the state of the battery. Specifically, the signal may include the battery's current charging state, meaning how much power is stored in the battery.

The console assembly 10 may include multiple chargers 22. For instance, the console assembly 10 may include an inductive charger 32 and an electric port 28. The console assembly 10 may have multiple electrical ports 28 of different types, for instance one electrical port 28 may be a cigarette lighter socket, another electrical port 28 may be a USB port. The console assembly 10 may also include an inductive charger 32. The chargers 22 may be disposed in various locations of the vehicle.

In instances where an inductive charger 32 is utilized, the inductive charger 32 is mounted to the bottom surface of the first floor 14. The inductive charger 32 may be attached to the bottom surface the first floor 14 using known attachment means such as mechanical fasteners, vibrational welding, adhesives, or a combination thereof. The first floor 14 may be formed of a material configured to facilitate the inductive transmission of electricity between the inductive charger 32 and the electronic device 23. Such material is currently known and used and illustratively includes a polymer or rubber.

The processor 24 may be a wireless charging module 36 packaged with the inductive charger 32. The charging module 36 is operable to receive and process information from the electronic device 23 so as to calculate the charging state of the electronic device 23. The charging module 36 may transmit the charging state to the vehicle's processor which actuates the light source 26 in accordance with the charging state.

Alternatively, the processor 24 may be disposed within the vehicle, such as a processor 24 commonly referenced by those skilled in the art as a body engine control unit. The processor 24 is operable to receive the signal and calculate the charging state of the battery. In such an embodiment, the processor 24 may receive information from the electronic device 23 through a USB connection, or a sensor 25 operable to detect the capacity of the battery of the electronic device 23.

The processor 24 is operable to transmit the signal to the light source 26 wherein the light source 26 is actuated upon detection of the signal. For instance, the light source 26 may be mounted to an undersurface of the top wall so as to direct light onto the first storage area 12. The processor 24 transmits the signal to the light source 26, wherein the light source 26 is actuated so as to visually notify the user that the electronic device 23 is being charged.

The processor 24 may be further operable to transmit the charging state of the battery to a light source 26. The light source 26 may be actuated so as to vary the characteristic of the emitted light in correspondence with the charging state of the battery. Specifically, the processor 24 may be further operable to process the signal so as to calculate the charging state of the battery. The calculated charging state may be transmitted to the light source 26 so as to actuate the light source 26 to vary the characteristic of the light in response to the charging state of the electronic device 23.

The light source 26 may be one of numerous light sources 26 currently known and used in the art. The light guide 38 may be configured to shine light into the first storage area 12. Alternatively, the light source 26 may be configured to shine light on the instrument panel of the vehicle. The light source 26 may be configured to change the characteristic of light emitted so as to provide the user with a visual indication of the charging state of the electronic device 23.

In one embodiment, the light source 26 is a light guide 38. The light guide 38 has a tubular body 40. The light guide 38 is disposed along at least one of the pair of first side walls 16. The light guide 38 is shown mounted to a top surface of the console assembly 10 so as to provide visual notification of the charging state of the electronic device 23. However, it should be appreciated that the light source 26 may be configured otherwise. For instance, the light guide 38 may be housed underneath a lip of the top edge of the first side walls 16. Thus, the light guide 38 is not seen, but the light emitted is reflected onto the first storage area 12.

The light guide 38 may increase in intensity to reflect the corresponding charging state of the electronic device 23. For instance, when the charging state is low, that is the battery is at zero to twenty-five percent capacity, the light guide 38 may emit a relatively low concentration of light which gradually increases as the charging state reaches one hundred percent capacity. Accordingly, the user may determine the charging state of the electronic device 23 without having to hold the device.

In another example, the light source 26 is a plurality of LEDs 42 operable to emit different colored light or a single LED 42 operable to emit different colored light using various filters. The LEDs 42 may be disposed under a lip of either the side, front or back wall of the first storage area 12 so as to be recessed along an upper edge of the storage area. The processor 24 may be operable to actuate the LED 42 so as to emit a certain color which corresponds to the charging state of the electronic device 23.

For instance, when the charging state is low, that is the battery is at zero to twenty-five percent capacity, the LED 42 may be actuated so as to emit a red light, visually indicating to the user that the battery is low. As the battery become further charged, the processor 24 may actuate the LED 42 so as to emit an orange light, indicating that the battery is between twenty-six to seventy-five percent capacity. The processor 24 may be further operable to actuate the LEDs 42 so as to emit a green light when the charging state of the battery is above seventy-five percent. Thus the user need not handle the electronic device 23 in order to determine the charging state of the battery.

Figure 3:
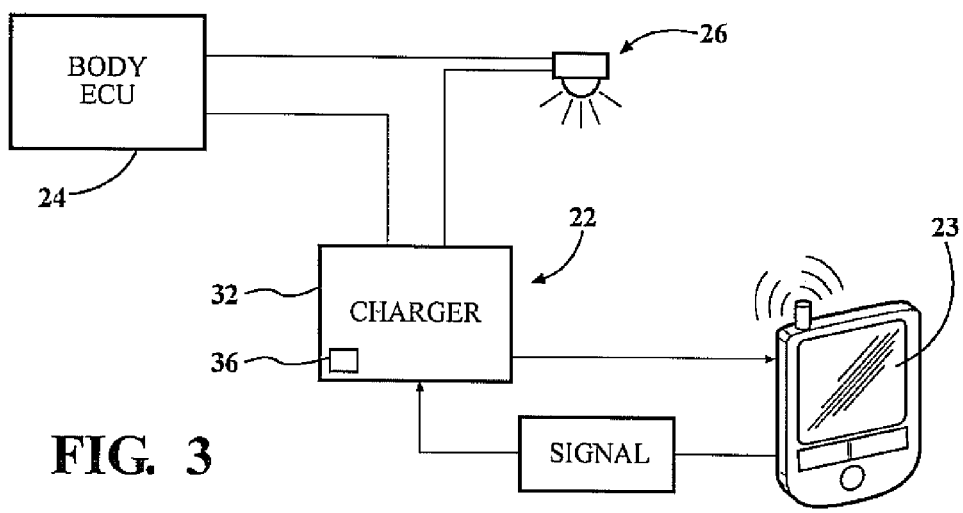
FIG. 3 is a perspective view of the system.

With reference now to FIG. 3, a system for providing visual notification of the charging state of an electronic device 23 is provided. The system includes a processor 24 and a light source 26. A charger 22 is operable to charge the electronic device 23. The processor 24 is operable to process the electronic device 23 or charger 22 so as to calculate the charging state of the electronic device 23. The processor 24 is further operable to communicate the charging state of the device to the light source 26 and may actuate the light source 26 so as to emit a light characteristic corresponding to the charging state of the battery of the electronic device 23.

In instances where the charger 22 is an inductive charger 32, the processor 24 may be a wireless charging module 36 packaged with the inductive charger 32. The charging module is operable to receive and process the signal to calculate the charging state. The charging module may be in direct communication with the light source 26 and operable to actuate the light source 26 when the electrical device is being charged. For instance, the light source 26 may be mounted to an undersurface of the top wall so as to direct light onto the first storage area 12. The processor 24 transmits the signal to the light source 26, wherein the light source 26 is actuated so as to visually notify the user that the electronic device 23 is being charged.

Alternatively, the processor 24 may be disposed within the vehicle, such as a processor 24 commonly referenced by those skilled in the art as a body engine control unit. The wireless charging module 36 calculates the charging state of the battery. The body engine control unit is operable to receive the signal from a wireless charging module 36 carrying the charging state of the electronic device 23.

The light source 26 may be actuated so as to vary the characteristic of the emitted light in correspondence with the charging state of the battery. The calculated charging state may be transmitted to the light source 26 so as to actuate the light source 26 to vary the characteristic of the light in response to the charging state of the electronic device 23.

In instances where the electronic device 23 is charged through an electrical port 28 such as a USB cord, battery information may be transferred from the electronic device 23 to the processor 24. In instances where the electrical port 28 is a cigarette lighter socket, a capacitive sensor may be used to determine the charging state of the battery. The processor is in electrical communication with the capacitive sensor 25 and actuates the light source 26 accordingly.

The light source 26 may be one of numerous light sources 26 currently known and used in the art. The light source 26 is configured to emit a different light characteristic which correspond to the charging state of the battery. The characteristics described herein are meant to be illustrative and not limiting. Those skilled in the art should appreciate that the light characteristics may not be limited to just intensity or color, but may include flashing, or any other visual property which allows the user to discern the charging state of the battery without having to hold the electronic device 23.

In one embodiment, the light source 26 is a light guide 38. The light guide 38 has a tubular body 40. The light guide 38 is operable to shine light into the first storage area 12. The light guide 38 is disposed along at least one of the pair of first side walls 16. The light guide 38 may increase in intensity to reflect the corresponding charging state of the electronic device 23. For instance, when the charging state is low, that is the battery is at zero to twenty-five percent capacity, the light guide 38 may emit a relatively low concentration of light which gradually increases as the charging state reaches one hundred percent capacity.

In another example, the light source 26 is a plurality of LEDs 42 operable to emit different colored light or a single LED 42 operable to emit different colored light using various filters. The processor 24 is operable to process the signal and actuate a respective one of the plurality of LEDs 42 to display a corresponding charge state. For instance, when the charging state is low, that is the battery is at zero to twenty-five percent capacity, the LED 42 may be actuated so as to emit a red light, and may emit an orange light when the battery is between twenty-six to seventy-five percent capacity, and emit a green light when the charging state of the battery is above seventy-five percent.

Obviously, many modifications and variations of the present invention are possible in light of the above teachings and may be practiced otherwise than as specifically described while within the scope of the appended claims. In addition, the reference numerals in the claims are merely for convenience and are not to be read in any way as limiting.

What is claimed is:

1. An automotive vehicle having a cabin space comprising:
   a console assembly disposed in the cabin space, the console assembly having an outer panel and a first storage area recessed with respect to the outer panel, the first storage area configured to hold an electrical device, the console assembly
   a charger operable to electrically charge the electrical device;
   a processor; and
   a light source fixedly mounted to the outer panel adjacent the first storage area, the processor operable to process the charger so as to calculate a charging state of the electronic device, the processor further operable to actuate the light source so as to emit a light characteristic corresponding to the charging state of the electronic device, wherein the light characteristic is transmitted into the cabin space so as to inform a user of the charging state of the electronic device without having to pick up the electronic device.

2. The console assembly as set forth in claim 1, wherein the charger is an electrical port in electrical communication with a power source.

3. The console assembly as set forth in claim 2, wherein the electrical port is one of either a Universal Serial Bus or a cigarette lighter socket.

4. The console assembly as set forth in claim 1, wherein the charger is an inductive charger operable to provide an inductive charge to charge an electronic device, the electronic device having a battery and operable to provide a signal to the charger wherein the charge state of the battery is provided.

5. The console assembly as set forth in claim 4, wherein the first storage area includes a first floor, a pair of first side walls, a first front wall, and a first back wall, the light source adjacent one of the pair of first side walls.

6. The console assembly as set forth in claim 5, wherein the light guide is disposed along at least one of the pair of first walls.

7. The console assembly as set forth in claim 1, wherein the light source is operable to vary the characteristic of the light, the processor further operable to process the signal so as to vary the characteristic of the light in response to the charging state of the electronic device.

8. The console assembly as set forth in claim 1, wherein the light source is a light guide, the light guide having a tubular body, the light guide operable to shine light through the tubular body and into the first storage area.

9. The console assembly as set forth in claim 1, wherein the light source is a plurality of LEDs operable to emit different colored light, the processor operable to process the signal and actuate a respective one of the plurality of LEDs to display a corresponding charge state.

10. A system for providing visual notification of a charging state of an electronic device in an automotive vehicle, the system comprising:
    a console assembly having a first storage area configured to hold the electrical device, the first storage area includes a first floor, a pair of first side walls, a first front wall, and a first back wall;
    a processor, operable to detect a signal from the electronic device, the processor processing the signal so as to calculate a charging state; and
    a light source, wherein the light source is actuated when the electrical device is being charged, the light source adjacent one of the pair of first side walls, the light source projecting upwardly so as to emit a light characteristic corresponding to the charging state of the electronic device, wherein the light characteristic is transmitted into a cabin space so as to inform a user of the charging state of the electronic device without having to pick up the electronic device.

11. The system as set forth in claim 10, wherein the processor is a wireless charging module.

12. The system as set forth in claim 10, wherein the processor is a vehicle body engine control unit.

13. The system as set forth in claim 10, wherein the light source is operable to vary the characteristic of the light, the processor further operable to process the signal so as to vary the characteristic of the light in response to the charging state of the electronic device.

14. The system as set forth in claim 10, wherein the light source is a light guide, the light guide having a tubular body, the light guide operable to shine light through the tubular body and into the first storage area.

* * * * *

UNITED STATES PATENT AND TRADEMARK OFFICE
CERTIFICATE OF CORRECTION

| | | |
|---|---|---|
| PATENT NO. | : 9,124,109 B2 | Page 1 of 1 |
| APPLICATION NO. | : 13/594231 | |
| DATED | : September 1, 2015 | |
| INVENTOR(S) | : Charan Singh Lota | |

It is certified that error appears in the above-identified patent and that said Letters Patent is hereby corrected as shown below:

In title page right hand side column, under Foreign Patent Documents,
delete "GB 2416533" and insert --GB 2416633--, therefor.
In column 6, Lines 19-30, delete the following text:
"6. The console assembly as set forth in claim 5, wherein the light guide is disposed along at least one of the pair of first walls.
7. The console assembly as set forth in claim 1, wherein the light source is operable to vary the characteristic of the light, the processor further operable to process the signal so as to vary the characteristic of the light in response to the charging state of the electronic device.
8. The console assembly as set forth in claim 1, wherein the light source is a light guide, the light guide having a tubular body, the light guide operable to shine light through the tubular body and into the first storage area."
and insert
--6. The console assembly as set forth in claim 1, wherein the light source is operable to vary the characteristic of the light, the processor further operable to process the signal so as to vary the characteristic of the light in response to the charging state of the electronic device.
7. The console assembly as set forth in claim 1, wherein the light source is a light guide, the light guide having a tubular body, the light guide operable to shine light through the tubular body and into the first storage area.
8. The console assembly as set forth in claim 5, wherein the light guide is disposed along at least one of the pair of first walls.--, therefor.

Signed and Sealed this
Seventh Day of June, 2016

Michelle K. Lee
*Director of the United States Patent and Trademark Office*